March 23, 1937.  H. G. AXTMANN  2,074,716
BRAKE
Filed Aug. 1, 1935  6 Sheets-Sheet 3

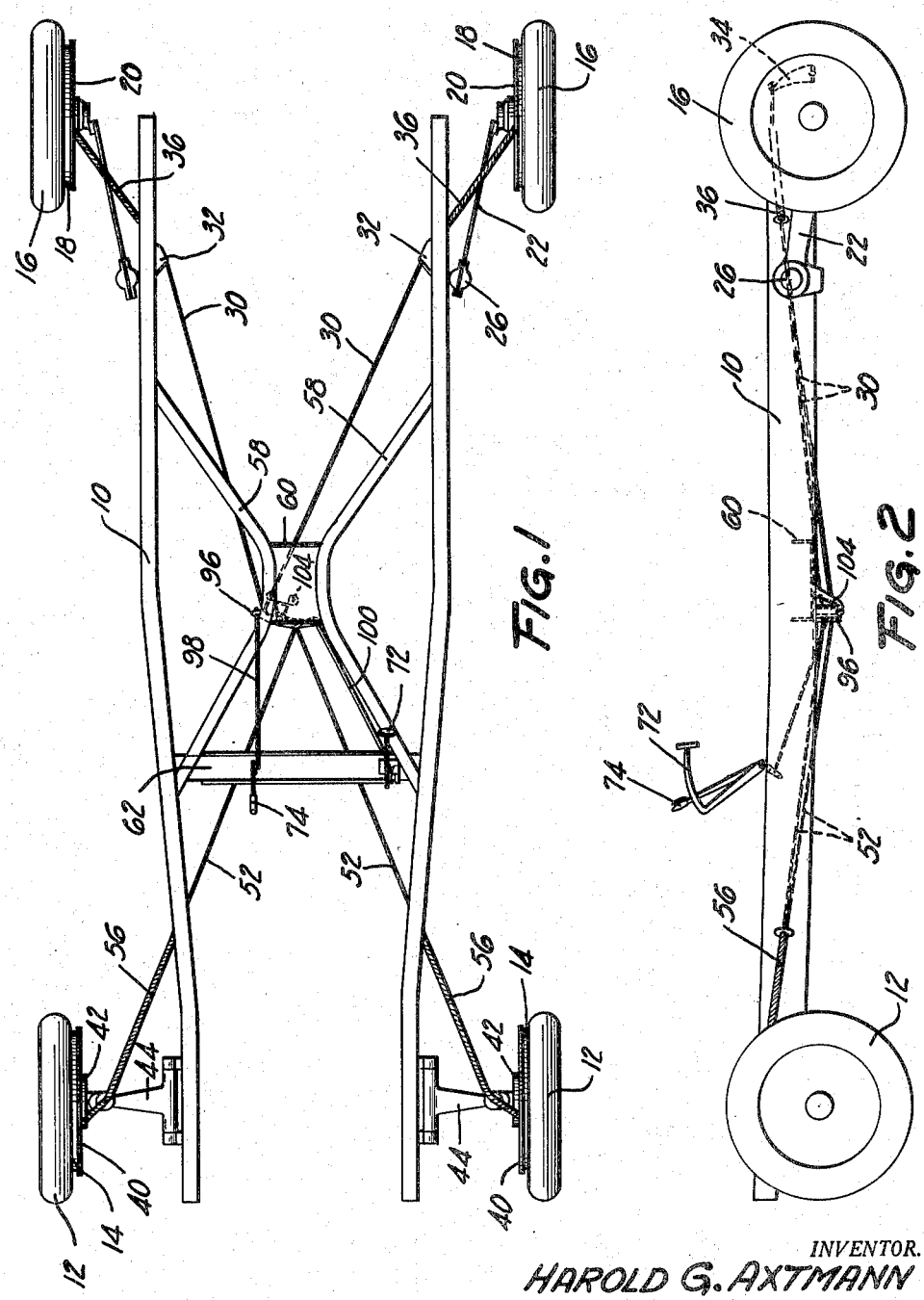

INVENTOR.
HAROLD G. AXTMANN
BY
ATTORNEY

March 23, 1937.  H. G. AXTMANN  2,074,716
BRAKE
Filed Aug. 1, 1935   6 Sheets-Sheet 4
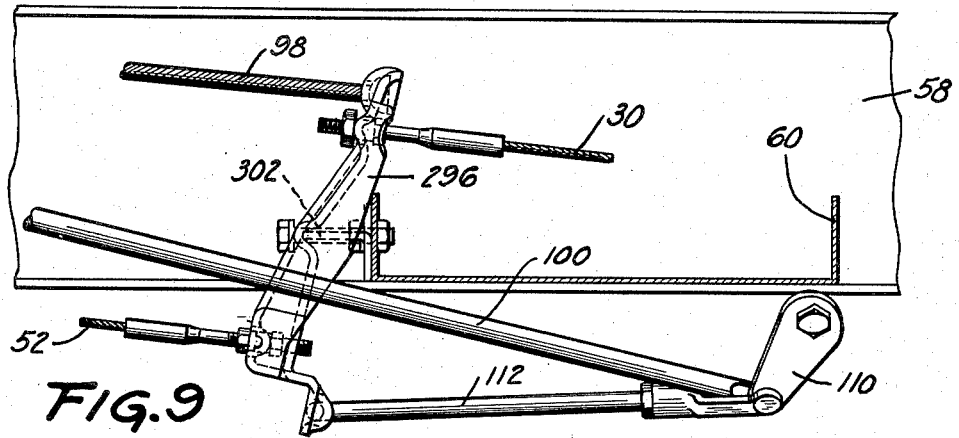
FIG. 9
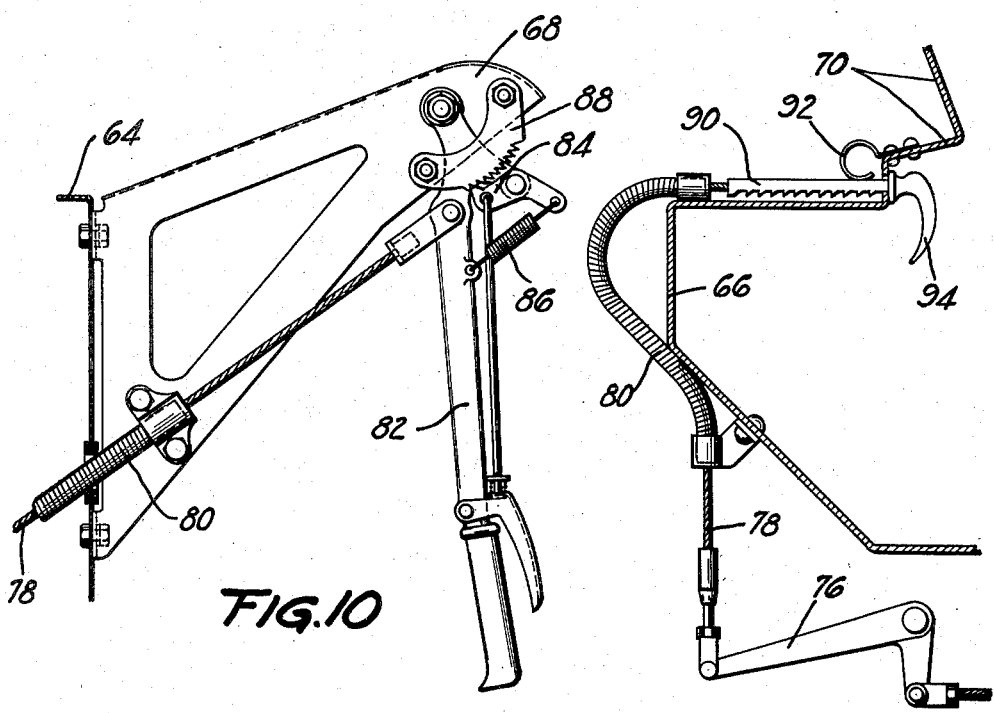
FIG. 10
FIG. 11
INVENTOR.
HAROLD G. AXTMANN
BY
ATTORNEY March 23, 1937. H. G. AXTMANN 2,074,716
BRAKE
Filed Aug. 1, 1935 6 Sheets-Sheet 5

INVENTOR.
HAROLD G. AXTMANN
BY
ATTORNEY

Patented Mar. 23, 1937

2,074,716

UNITED STATES PATENT OFFICE 2,074,716

BRAKE

Harold G. Axtmann, Dearborn, Mich., assignor to Bendix Products Corporation, South Bend, Ind., a corporation of Indiana Application August 1, 1935, Serial No. 34,235

4 Claims. (Cl. 188—10)

This invention relates to brakes, and is illustrated as embodied in a system of mechanical connections for operating a set of four-wheel brakes.

An object of the invention is to provide a simple operating mechanism, illustrated as embodying a single horizontal lever connected in a novel manner for operation by either of two operating members (e. g. a pedal and a hand lever). One feature of the invention, from this point of view, relates to mounting the described lever on a vertical knife-edge serving as its fulcrum.

Another object of the invention is to utilize the rigidity of wheel mountings of the individually sprung type utilizing rigid pivoted levers as substitutes for the conventional axles, to permit the use of simple cable connections for the brakes by arranging them in a novel manner relatively to the levers carrying the wheels.

Other objects and features of the invention, including a novel "emergency" brake operator mounted on the instrument board, and other novel combinations of parts and desirable particular constructions, will be apparent from the following description of the illustrative constructions shown in the accompanying drawings, in which:

Figure 1 is a top plan view of an automobile chassis embodying my invention;

Figure 2 is a side elevation thereof;

Figure 9 is a partial plan view of an alternative arrangement with a knife-edge bearing;

Figure 10 is a vertical section through the vehicle dash and instrument board, showing a novel "emergency" brake operator;

Figure 11 is a similar section showing an alternative construction;

Figure 3:
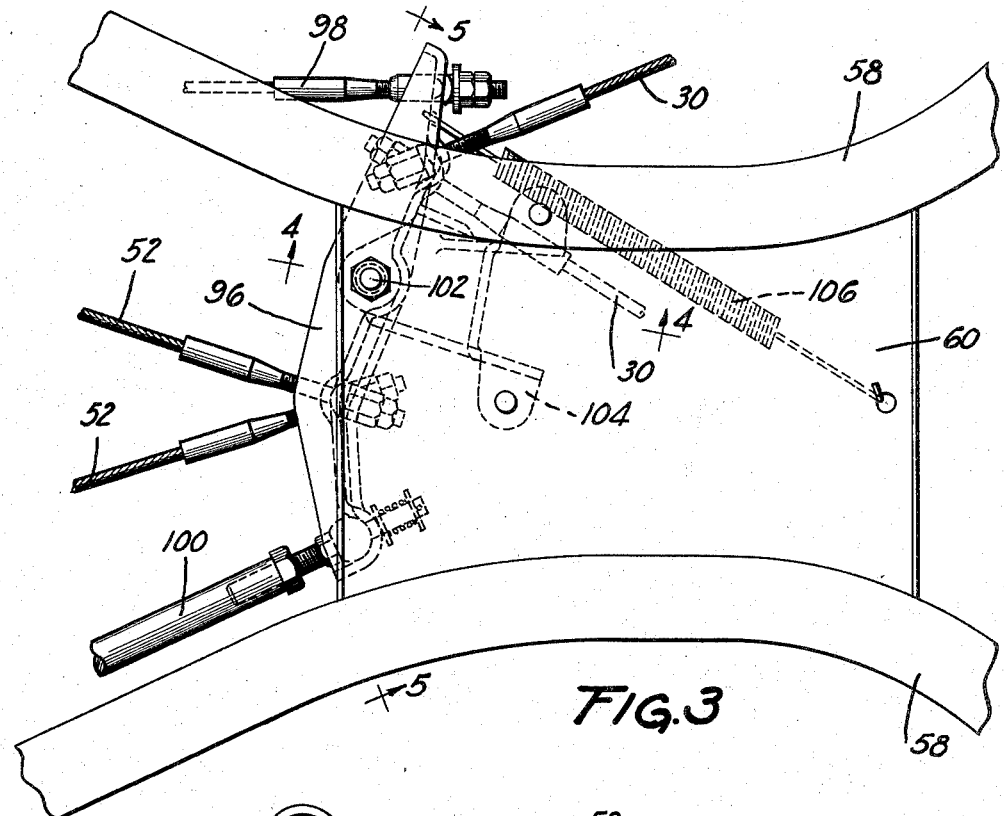
Figure 3 is a plan on a larger scale of the central part of the chassis.
Figure 5:
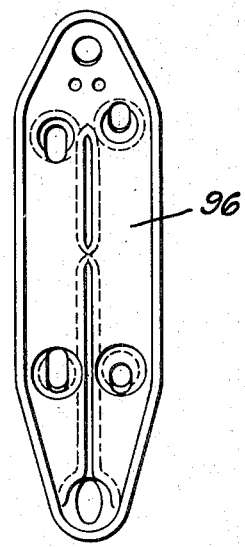
Figure 5 is an elevation of the horizontal brake-operating lever.
Figure 4:
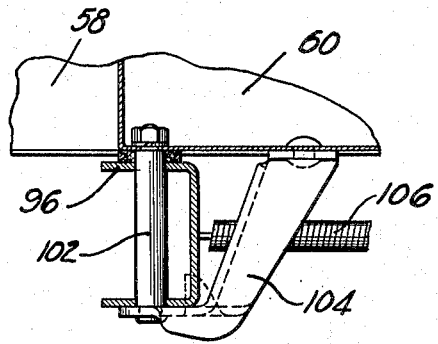
Figure 4 is a partial section on the line 4—4 of Figure 3, showing one form of lever bearing.

The illustrated vehicle comprises a frame 10 supported on front wheels 12 having brakes 14 and rear wheels 16 having brakes 18.

Each rear brake has a backing plate 20 (Figures 12 and 13), shown as part of a wheel mounting including an individual spring suspension for the two rear wheels. This suspension includes for each wheel a longitudinally-extending lever 22 carrying at its rear end the backing plate 20 and the usual wheel spindle 24 rigidly secured thereto. The front end of each lever 22 is pivoted on the frame 10, for example by being provided with a spherical socket 26 embracing the ball end of a bracket 28 fixed on the frame 10. Suitable springs (not shown) resist movement of levers 22.

Preferably advantage is taken of the above-described construction to operate the brake by a simple tension connection such as a cable 30 constrained, by means such as a guide 32, to pass adjacent the pivot 28, and thence passing to and into the brake, through the backing plate 20, to operate suitable brake-applying means such as a lever 34.

The brake proper is not herein illustrated but may, if desired, be of the type fully described in Parker and House Patent No. 1,994,434, granted Bendix Brake Company on March 12, 1935.

Figure 12:
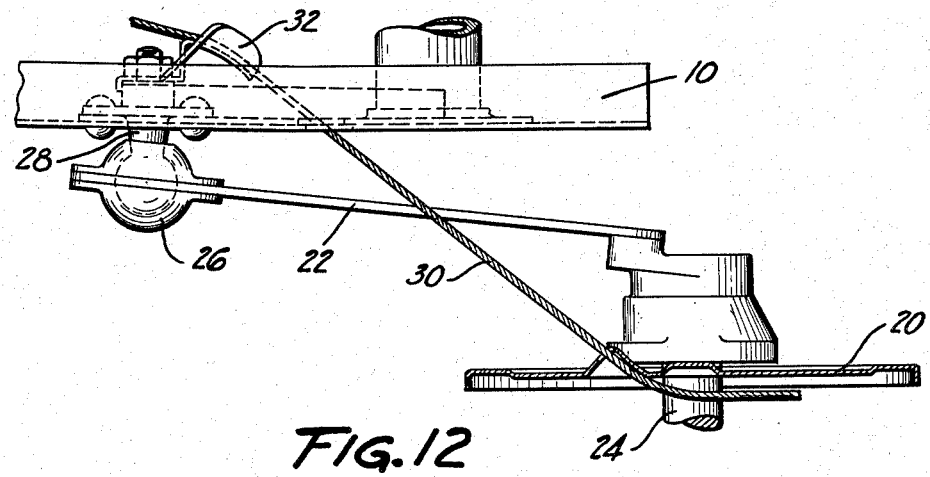
Figure 12 is a view partly in plan and partly in section showing one rear wheel mounting and associated parts.
Figure 13:
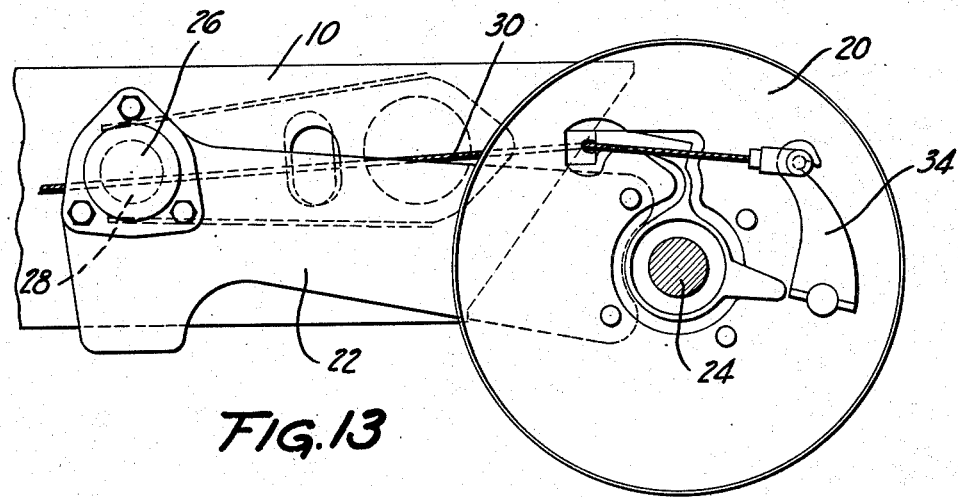
Figure 13 is a side elevation thereof.
Figure 14:
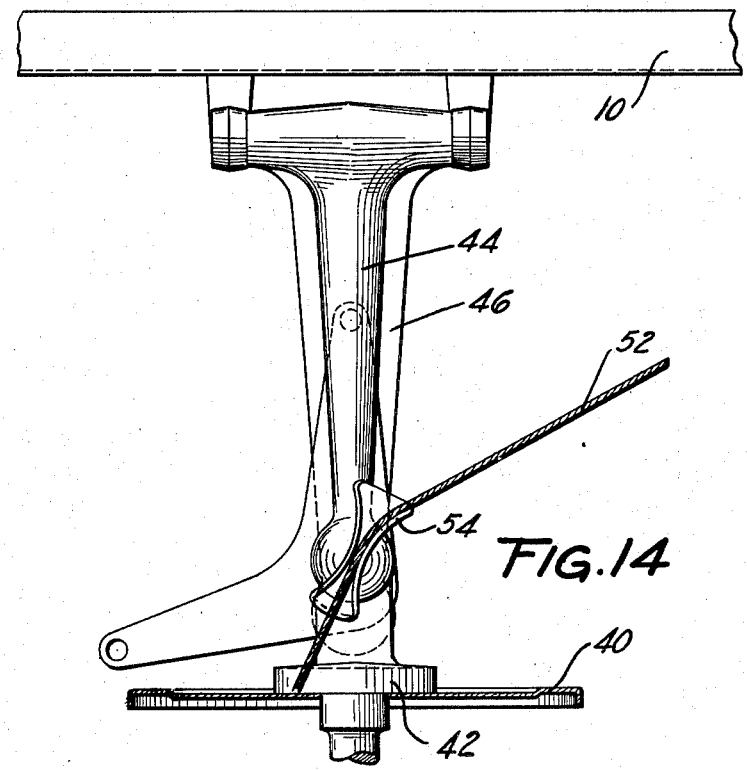
Figure 14 is a view partly in plan and partly in section, showing one front wheel mounting and associated parts.
Figure 15:
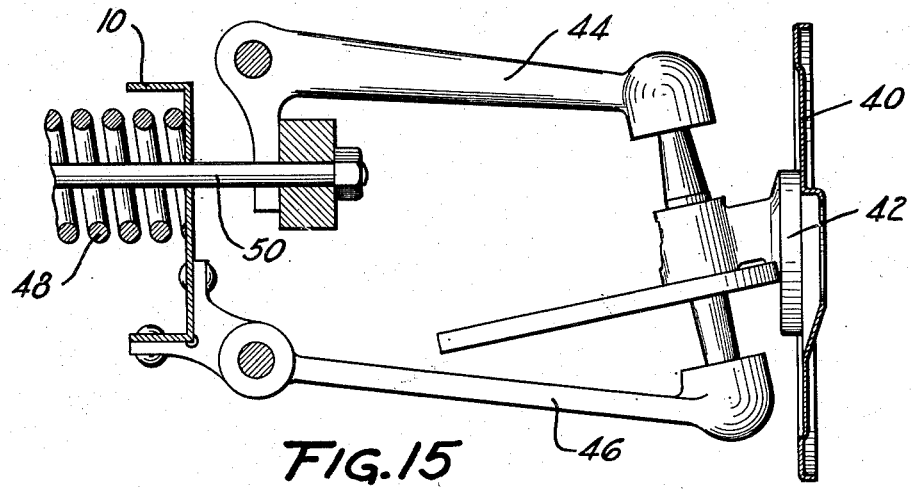
Figure 15 is a transverse partial section showing these parts in front elevation.

If preferred, instead of the bare cables of Figures 12 and 13, the brake may be operated by Bowden controls, the cables 30 passing through flexible Bowden conduits 36 (Figures 1 and 2) secured at their opposite ends to the frame 10 and the brake backing plates 20.

The front brakes are shown with backing plates 40, mounted on wheel knuckles 42 swiveled, for example by ball-and-socket joints, to two horizontal parallel transverse levers 44 and 46 pivoted at their inner ends to the chassis frame 10. The rocking of these levers is resisted by coil springs 48 sleeved on links 50 connected to short vertical arms of levers 44.

In this case the brakes may be operated by cables 52 which are left bare and which pass through guides 54 at the swiveling axis of the wheels. If preferred, however, as shown in Figures 1 and 2, the cables 52 (instead of having guides 54) may pass through flexible Bowden conduits 56 secured at their ends to the frame 10 and the backing plates 40.

The frame 10 preferably has an X-shaped subframe comprising two subframe members 58 connected to the frame 10 at their ends, and which are connected by means such as a saddle 60. Adjacent the front ends of the members 58 there may be a cross reinforcing connection 62, which may if desired support a dash 64 or 66 (Figures 10 and 11) which in turn supports a separate or integral instrument board 68 or 70. The member 62 in Figures 1 and 2 is shown supporting two alternatively-operable brake operators such as a pedal 72 and a hand lever 74.

If preferred, as shown in Figures 10 and 11, the hand lever may be replaced by a suitable bellcrank 76 or the like, operated by a Bowden control having a cable 78 connected to the lever 76, and a flexible conduit 80 housing the cable 78 and having its ends fixed.

In Figure 10, the cable 78 is connected to a vertical lever 82 pivoted at its upper end on the instrument board 68 and swinging fore and aft. Lever 82 may have a locking pawl 84 urged by a spring 86 against a fixed ratchet 88.

In Figure 11, cable 78 is connected to a plunger 90 having ratchet teeth engageable with and urged by a spring 92 against the edge of an opening in the instrument board 70, and operated by a pull handle 94.

Preferably all of the brakes are operated by a novel channel-section horizontal lever 96, having a connection 98 to the hand lever 74 (or the lever 76) at one end, and having a connection 100 to the pedal 72 or its equivalent, at the other end. The lever 96 has the cables 30 connected between its center and one end, and has the cables 52 connected between its center and the other end.

In Figures 1-5, the lever 96 is centrally fulcrumed on a vertical pivot pin 102 secured at one end to the member 58 and at its other end to a bracket 104 carried by member 58. A return spring 106 may be provided for the lever 96.

Figure 6:
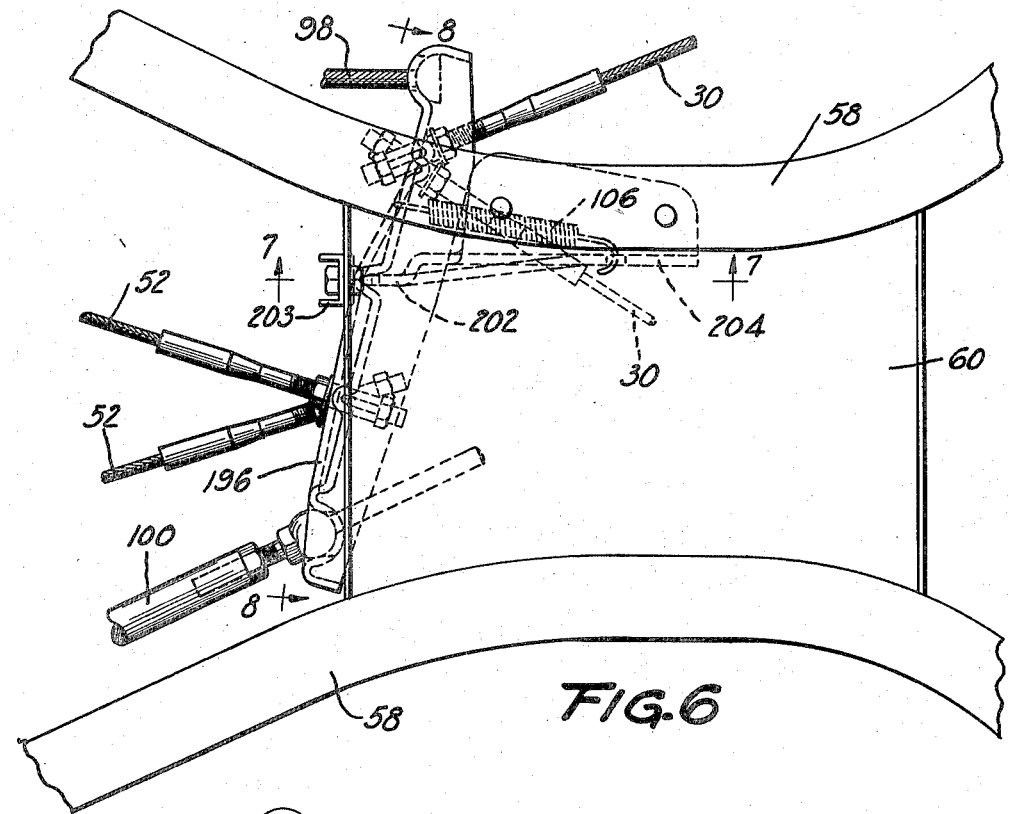
Figure 6 is a view corresponding to Figure 3, but showing a novel knife-edge bearing for the lever.
Figures 7, 8:
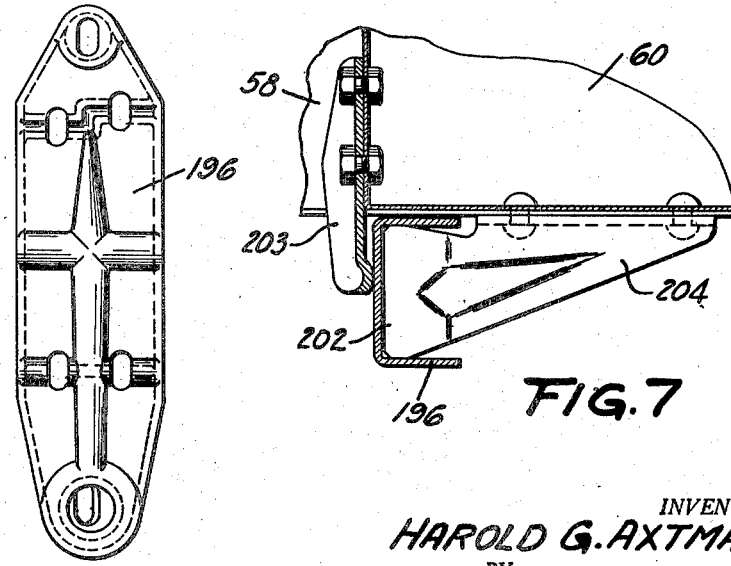
Figure 7 is a partial section on the line 7—7 of Figure 6, showing the knife-edge and its mounting.
Figure 8 is an elevation of the lever of Figure 6.

In Figures 6-8, a lever 196, similarly connected, is mounted on a novel vertical knife-edge fulcrum 202 formed on the forward end of a bracket 204 carried by one member 58. A safety bracket 203 prevents possible separation of the lever 196 and the fulcrum 202.

In Figure 9, the pedal connection 100 is connected to an idler lever 110 which in turn has a connection 112 to one end of a lever 296 corresponding to levers 96 and 196 described above, and shown mounted on a fixed vertical knife-edge bearing 302. This bearing, like bearing 202, extends into the channel of its lever and forms an almost frictionless pivot fulcrum therefor.

While several illustrative constructions have been described in detail, it is not my intention to limit the scope of my invention to those particular constructions, or otherwise than by the terms of the appended claims.

I claim:

1. Brake-operating connections for a system including two front and two rear brakes comprising a horizontal lever having a fulcrum adjacent its center, a hand lever connected to one end, a pedal connected to the other end, connections to the two rear brakes between the fulcrum and the connection at one end of the lever, and connections to the two front brakes between the fulcrum and the connection at the other end of the lever.

2. Brake-operating connections for a system including two front and two rear brakes comprising a horizontal lever having a fulcrum adjacent its center, two operating devices connected to opposite ends of the lever, connections to the two rear brakes between the fulcrum and the connection at one end of the lever, and connections to the two front brakes between the fulcrum and the connection at the other end of the lever.

3. Brake-operating connections for a system including two front and two rear brakes comprising a horizontal lever having a vertically arranged knife-edge forming a fulcrum and engaging said lever adjacent its center, two operating devices connected to opposite ends of the lever, connections to the two rear brakes between the fulcrum and the connection at one end of the lever, and connections to the two front brakes between the fulcrum and the connection at the other end of the lever.

4. Operating connections comprising a channel-section horizontal lever connected to different brakes on opposite sides of its center, operating means connected to the opposite ends of said lever, and a fixed bracket having a wide vertical knife-edge extending into the channel of said lever and engaging it and forming a fulcrum therefor.

HAROLD G. AXTMANN.